United States Patent [19]

Hesse et al.

[11] 3,925,899

[45] Dec. 16, 1975

[54] GRAPHICS INSTRUMENT

[76] Inventors: Sarah Hesse, 929 Oxford St., Berkeley, Calif. 94707; Justin J. Shapiro, 39 Domingo Ave., Berkeley, Calif. 94705

[22] Filed: Mar. 19, 1974

[21] Appl. No.: 452,635

[52] U.S. Cl. .................................. 33/75; 33/1 N
[51] Int. Cl.² ......................................... B43L 7/06
[58] Field of Search ........... 33/1 N, 1 SD, 75 R, 111

[56] References Cited
UNITED STATES PATENTS

| | | | |
|---|---|---|---|
| 1,062,740 | 5/1913 | Sharpe | 33/75 R |
| 2,004,951 | 6/1935 | Jensen | 33/1 N |
| 2,007,986 | 7/1935 | Sprague | 33/1 SD |
| 2,190,071 | 2/1940 | Keppers | 33/75 R |
| 2,480,914 | 9/1949 | Gallington et al. | 33/75 R |
| 3,432,927 | 3/1969 | Springer | 33/1 SD |
| 3,460,261 | 8/1969 | Frey | 33/75 R |

FOREIGN PATENTS OR APPLICATIONS

| | | | |
|---|---|---|---|
| 819,563 | 10/1937 | France | 33/1 N |

Primary Examiner—Richard E. Aegerter
Assistant Examiner—John W. Shepperd
Attorney, Agent, or Firm—Flehr, Hohbach, Test, Albritton, & Herbert

[57] ABSTRACT

A graphics instrument is disclosed for use in drawing and measuring. The instrument includes a pair of coplanar scale members mounted for concentric mutual rotation. A circular graduated scale on the outer member displays angular degree and radian values, and this scale is in register with a circular graduated scale on the inner member which displays both angular and trigonometric function values. Straight edges are formed to extend along axes of each scale member to facilitate measurement and drawing by a marking instrument. In one embodiment the outer member defines a polygon configuration which provides a straight edge, and the straight edge of the inner member extends along a diameter of the latter. In another embodiment the two members are annular and carry radially extending arms which define straight edges upon which graduated linear measurement scales are marked. The inner member is formed with a central opening into which extensions of the two arms project. The inner terminal ends of the arm extensions meet at the center of the two scale members to facilitate drawing the vertex of an angle. The arms may be releasably locked in any selected position about the scale members by means of the eccentric cam locks and the arms may be assembled in inverse position to function as a T-square. A sliding indicator may be moved to a selected position along one arm to facilitate drawing an arc with any radius along the arm while simultaneously measuring the radius and value of the arc which is drawn.

1 Claim, 15 Drawing Figures

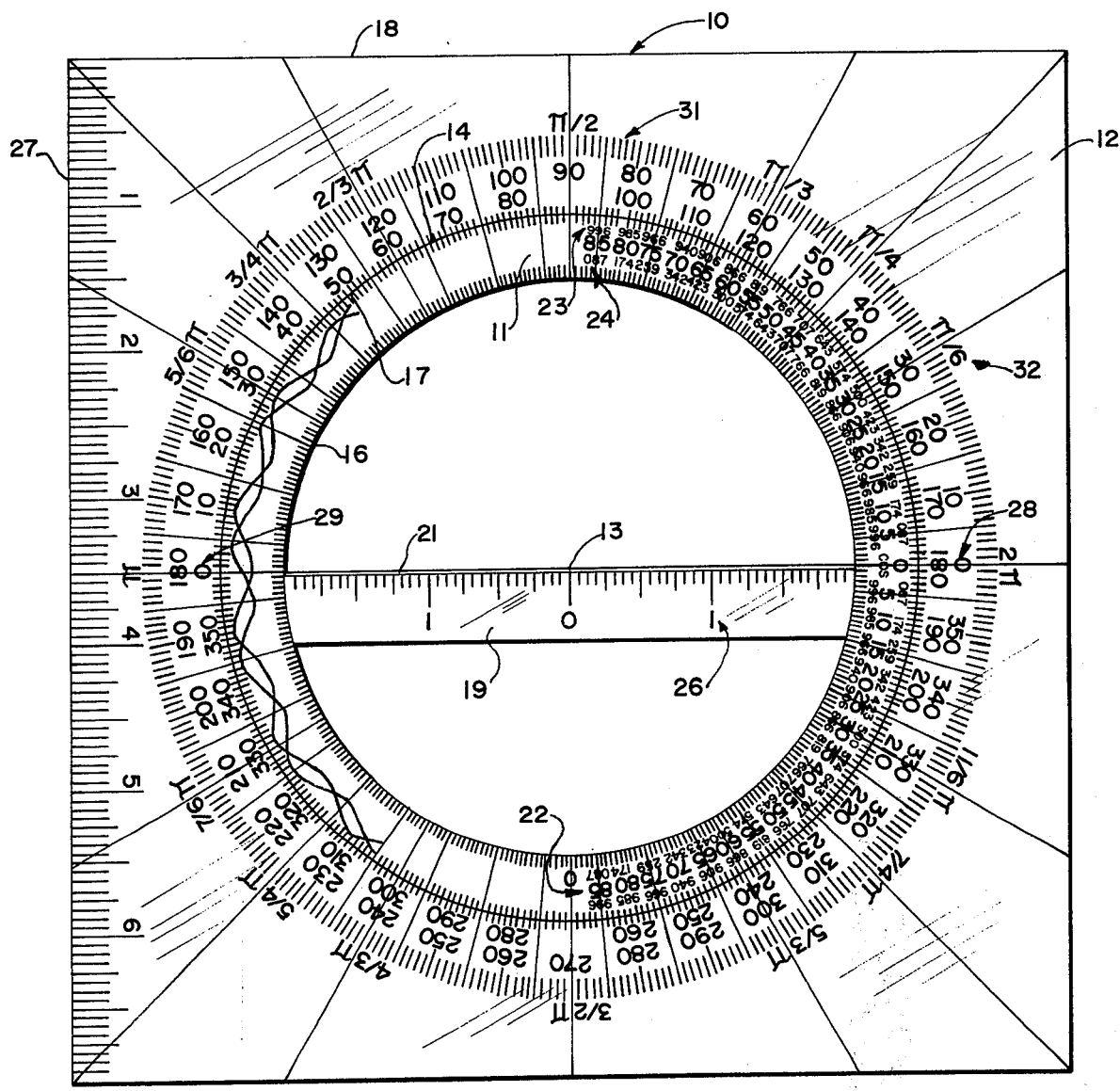
FIG.—1
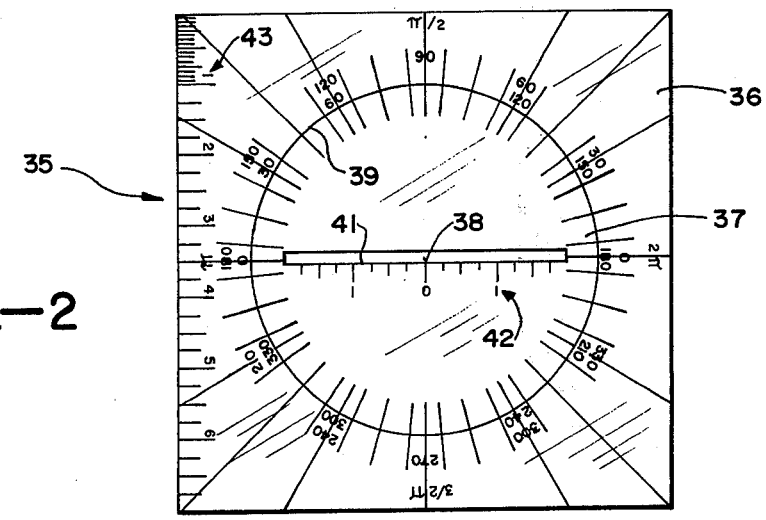
FIG.—2

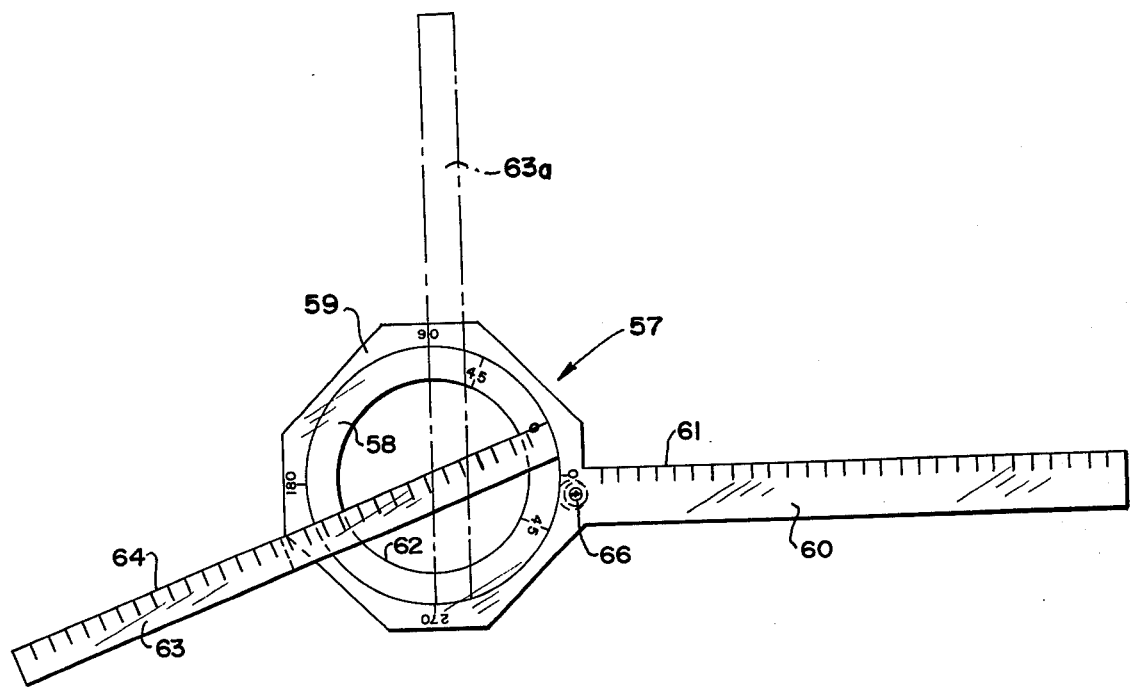
FIG.—3
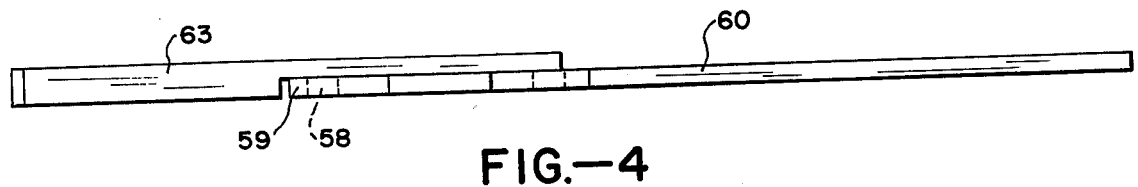
FIG.—4
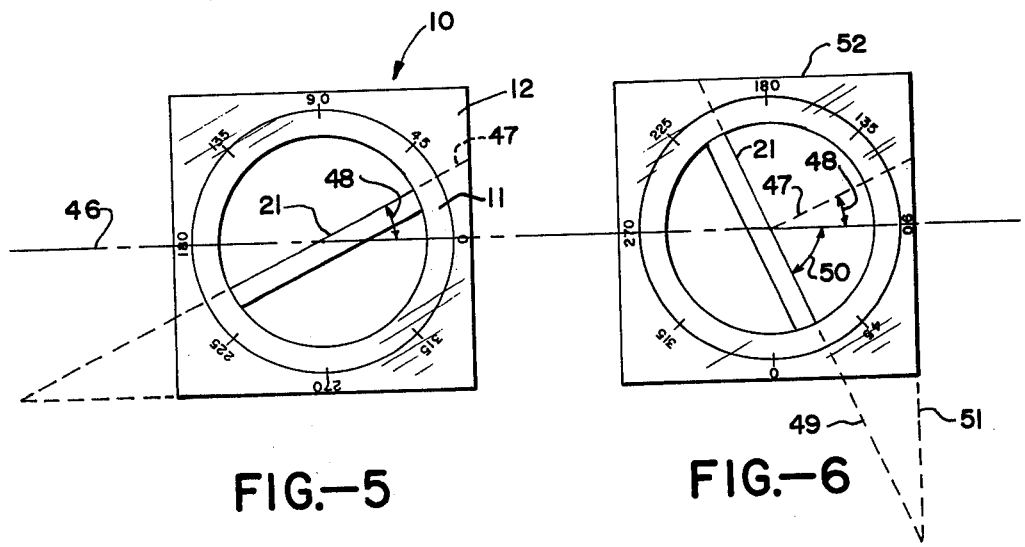
FIG.—5    FIG.—6

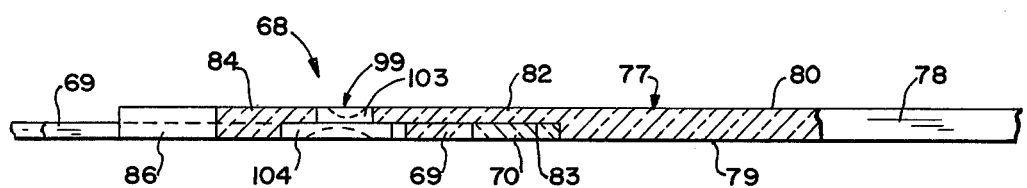
FIG.—10
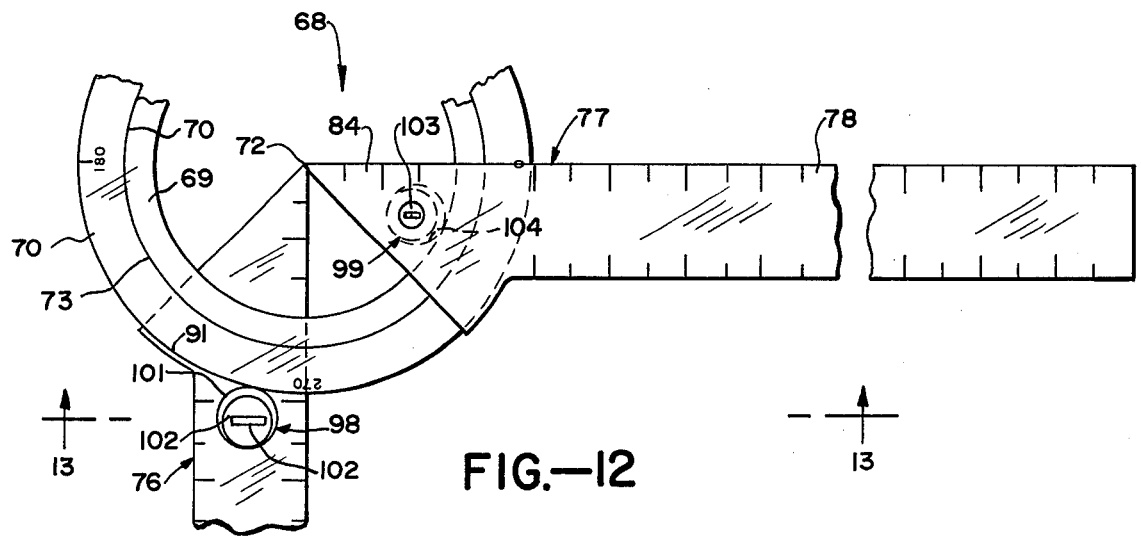
FIG.—12
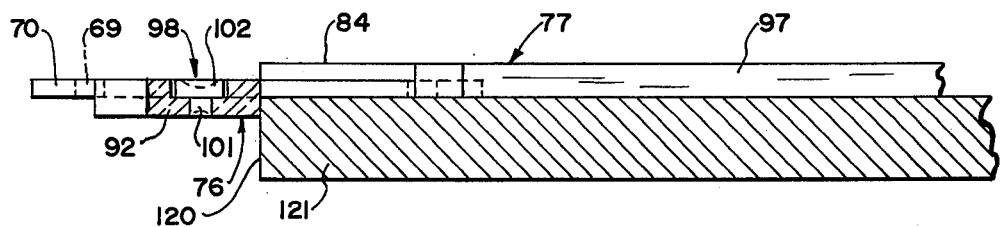
FIG.—13
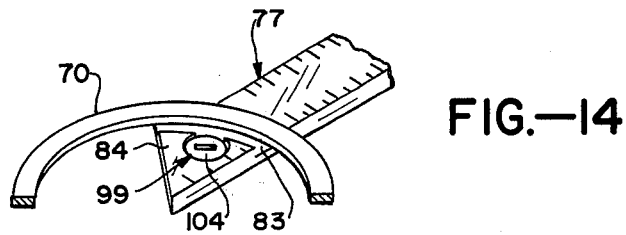
FIG.—14
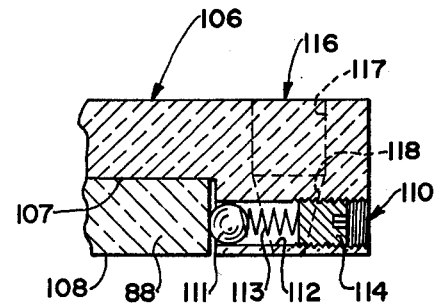
FIG.—11
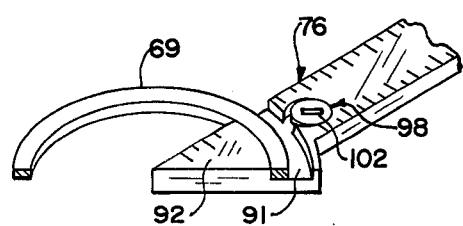
FIG.—15

3,925,899

GRAPHICS INSTRUMENT

BRIEF SUMMARY OF THE INVENTION

This invention relates in general to graphics, and in particular relates to graphics instruments for drawing and measuring lines, arcs, angles and many other geometric and graphic figures, values and illustrations.

Various types of graphics instruments have previously been provided for use by draftsmen, graphics illustrators, architects, engineers, and students. Among these instruments are the well-known protractor for measuring angles, the T-square, drawing triangles, compasses and the like. While these prior art instruments are useful in many applications, they have their limitations in that they can not be easily used in drawing and measuring certain geometric figures and values. For example, heretofore there has been no simple instrument to draw a combination of geometric figures such as the complement of any given angle, a family of lines which envelop various curves such as parabolas, hyperbolas, spirals and ellipses, and parallel lines inclined at a selected angle with respect to any reference line. In addition, prior art graphics instrument of the character described have not been readily adaptable to measuring trigonometric functions such as the sine and cosine values of any angle or the polar coordinates of any points on a plane. Such information is desirable as a basis for measurements involving the use of triangulation, arc lengths, areas of arc sections and the like.

OBJECTS AND SUMMARY OF THE INVENTION

It is a general object of the invention to provide a new and improved graphics instrument which facilitates the convenient and rapid drawing of lines, angles, arcs, triangles, curves and other geometric figures as well as the measurement of lines, angles, arc lengths, areas of arc sections, trigonometric functions and the like.

Another object is to provide a graphics instrument of the character described which employs a pair of coplanar, mutually rotatable concentric scale members provided with straight edges and graduated scales arranged to facilitate the drawing of various geometric figures and obtaining mathematical values.

Another object is to provide a graphics instrument of the character described which facilitates the measurement and drawing of any angle without the requirement of lining up points, while at the same time providing a display of trigonometric functions of that angle.

Another object is to provide a graphics instrument of the character described in which an inner scale member turns within an outer scale member that is formed in the configuration of a polygon. Straight edges are provided on the two members for use of the instrument in drawing of the complement of any angle such as for infinitely variable right triangles, as well as in drawing inclined parallel lines or a family of lines which envelope various curves.

Another object is to provide a graphics instrument of the character described in which radial arms marked with graduated linear scales are carried by the inner and outer scale members, and in which means are provided to selectively lock the scale members in a configuration whereby the instrument may be utilized as a T-square which engages a drawing board with one arm extending across the board at a selected angle.

Another object is to provide a graphics instrument of the character described employing radial arms carried by the scale members in which an indicator is slidably mounted for movement to a selected position along one arm to serve as a compass for drawing or measuring an arc of a given radius and arc length.

The present invention is characterized in providing a graphics instrument having inner and outer coplanar scale members which are mounted for mutual rotation about a common center. The outer member is formed with a circular graduated scale describing degree and radian angular measurement, and the inner member is formed with a circular gradiants scale in register with the outer scale and which describes trigonometric function and angle measurement. The inner member carries a first straight edge along an axis extending through the common center while the outer member carries another straight edge extending along a second axis. In one embodiment the outer member is formed in the configuration of a polygon of which one side forms a straight edge while the inner member comprises an annulus which carries across its diameter the first straight edge. In another embodiment radial arms are carried by the inner and outer members with inner terminal portion of these arms freely meeting at the common center. In the latter embodiment cam lock means are provided to hold the arms in a selected position along one of the arms to permit the instrument to be used as a compass.

Additional objects and features of the invention will appear from the following description in which the preferred embodiments have been set forth in detail in conjunction with the accompanying drawings.

BRIEF DESCRIPTION OF THE DRAWINGS

FIG. 1 is a plan view of one embodiment showing a graphics instrument made in accordance with the invention;

FIG. 2 is a plan view of another embodiment of the invention to a reduced scale;

FIG. 3 is a plan view of another embodiment of the invention;

FIG. 4 is a front edge view of the embodiment of FIG. 3;

FIG. 5 is a plan view to a reduced scale of the embodiment of FIG. 1 showing one step in drawing the complement of a given angle;

FIG. 6 is a plan view similar to FIG. 5 showing a further step in drawing the complement angle;

FIG. 10 is a partial cross-sectional view taken along the lines 10—10 of FIG. 9;

FIG. 11 is a partial cross-sectional view taken along the line 11—11 of FIG. 9;

FIG. 12 is a plan view of the embodiment of FIG. 9 with the elements inverted for use as a T-square;

FIG. 13 is a partial cross-sectional view taken along the line 13—13 of FIG. 12;

FIG. 14 is a partial perspective view to a reduced scale of one element of the embodiment of FIG. 9; and FIG. 15 is a partial perspective view to a reduced scale of another element of the embodiment of FIG. 9.

DESCRIPTION OF THE PREFERRED EMBODIMENTS

Figure 7:
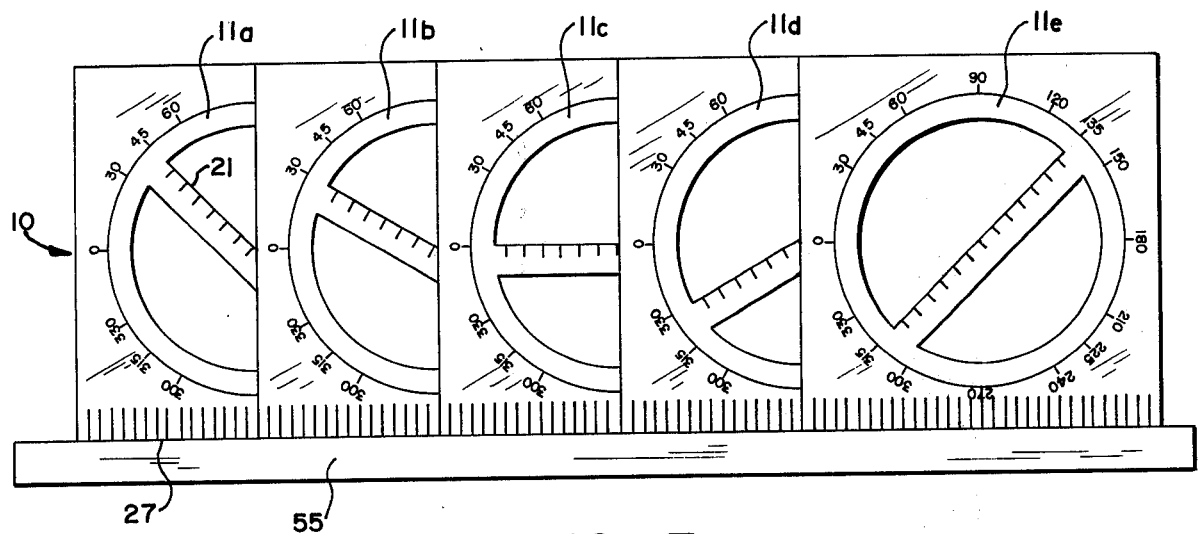
FIG. 7 is a plan view to a reduced scale of the embodiment of FIG. 1 shown in use in drawing a family of lines enveloping a curve.

In the drawings FIG. 1 illustrates generally at 10 a graphics instrument incorporating one embodiment of the invention. Graphics instrument 10 includes inner scale member 11 and outer scale member 12 which are of a flat, relatively thin coplanar construction and are mounted for concentric mutual rotation about a common center 13. The two scale members are composed of a light-weight material such as a thermoplastic or thermosetting synthetic polymer formed by suitable means such as injection molding, although the members could also be of wood, metal, or other suitable material. Preferably the scale members are transparent to permit underlying figures on a drawing board to be observed, although the members could also be opaque.

Inner scale member 11 is formed with an annular configuration having a circular outer periphery 14 and central opening 16. The outer scale member is also formed with a central opening 17 having a diameter commensurate with the outer diameter of the inner member. The two scale members are mounted for mutual rotation about center 13 by suitable means such as by providing a sliding tongue and groove fit between the inner and outer peripheries of the two members.

The outer periphery 18 of scale member 12 is formed in the configuration of a polygon, which in the case of the embodiment of FIG. 1 comprises a square of which the side edges form equal length straight edges. These side edges may thus be aligned against a T-square, for example, on a drawing board and may also be used for drawing lines along each of the side edges.

An elongate arm 19 extends from opposite sides of inner member 11 across central opening 16 with a side edge 21 of this arm forming a straight edge aligned along a diameter which intersects the center of rotation of the two members. Preferably arm 19 is formed integral with and of the same material as the inner scale member.

Scalar and other information indicia is formed on the two scale members. Preferably the indicia is printed on the bottom side of the scale members which contacts the drawing board so that the various figures and measurement indices can be read through the transparent scale members without parallax error. Where the members are constructed of an opaque material, then the indicia would be printed on the top sides of these members.

The indicia on inner scale member 11 displays several graduated scales which include an angular degree scale 22 for the cardinal values of 5° increments, starting at 0° on the axis line which forms a continuation of straight edge 21. Scale 22 continues on either side of this axis along the upper and lower right hand quadrants. Unnumbered marks for each degree of angular measurement are located along the complete inner and outer periphery of the inner scale member. Trigonometric scales are also provided on scale member 11 comprising sine and cosine values for each cardinal angle, although other trigonometric functions could also be provided. Sine scale 23 displays the sine values for the cardinal angles along the outer periphery in the upper and lower quandrants, and cosine scale 24 displays the cosine values for the cardinal angles along the inner periphery in these quadrants. A graduated linear measurement scale 26 is formed on arm 19 along the straight edge, and preferably this scale displays inch unit measurement using the center 13 as zero value, although this scale could also be in metric units. As described other indicia may be applied to the inner scale, such as examples of trigonometric formulas and the like.

At least one side edge 27 of outer scale member 12 is formed with a graduated scale of linear measurement, such as the illustrated inch units, although metric units could also be provided. The inner periphery 17 of scale member 12 is also printed about its circumference with marks for each angular degree, and these marks are adapted to register with the facing degree indicia on the outer periphery 17 of the inner scale member. Cardinal degree numbers, such as for every 10° of angular measurement, are printed in two concentric rows 28, 29 between these degree markings. Outer row 28 is oriented with the 0° value on the right side, as viewed in FIG. 1, of an axis line which intersects common center 13, and inner row 29 is oriented with the 0° on the left side of this axis line. Another circular row 31 of degree marks is printed about the outer row of cardinal numbers.

A graduated scale of radian measurement is also provided on outer scale member 12. The radian values for various cardinal angles, such as $\pi/6$ for 30° etc., is printed in a circular row 32 about the outer row of degree marks. The lines for the radian values of the cardinal angles are extended radially outward to the side edges of the outer scale to facilitate the reading of angle values at the edges of the instrument.

FIG. 2 illustrates generally at 35 a graphics instrument incorporating another embodiment of the invention. Instrument 35 comprises an outer scale member 36 which is similar in construction to the outer member described for the embodiment of FIG. 1, together with an inner scale member 37. The outer scale member is formed with a square configuration of which the side edges provide straight edges for drawing purposes.

Inner scale member 37 comprises a circular disc mounted for rotation about common center 38 within a circular opening 39 formed in the outer scale member by suitable means such as a sliding tongue and groove fit. The two scale members are formed with flat, co-planar surfaces for use on the surface on a drawing board. The scale members are composed of a suitable material similar to that described for the embodiment of FIG. 1, preferably a transparent material such as a synthetic polymer.

Inner scale member is formed with an elongate slot having a side edge 41 which defines a straight edge extending along an axis which intersects common center 38.

The two scale members are imprinted with indicia, preferably on the bottom side, which provide the graduated scales and other information similar to that described for the embodiment of FIG. 1. Thus, a graduated linear measurement scale 42 in inch units is printed along the axis of side edge 41 of the inner scale member, and a graduated linear measurement scale 43 is printed along the left side edge of outer member 36. Angular degree scales are formed in circular rows about the inner and outer peripheries of the two scale members, and the values of the cardinal angles, radian values and sine and cosine values are also printed in the manner described for the embodiment of FIG. 1.

The use and operation of graphics instrument 10 of the embodiment of FIG. 1 will now be explained, and it is understood that this description will have equal application to the embodiment of FIG. 2. Assume first that the instrument is to be used for purposes of measuring and drawing the complement of any given angle. Such a procedure will find application, for example, in drawing the infinitely variable right triangle, that is in which a right triangle of any given size and configuration is to be drawn in any orientation on the drawing board. As illustrated in FIG. 5 graphics instrument 10 is positioned flat on the drawing board with its lower side aligned along a reference edge, such as the arm of a T-square. The instrument is traversed along the T-square until centered on the desired position over a reference line 46. Assuming that the given angle is 30°, inner scale member 11 is manually turned, while holding outer member 12 fixed, until the 0° mark on the axis of straight edge 21 registers with the 30° mark in the first quadrant of the scale of the outer member. A marking instrument is then used to draw a line 47 along the straight edge across the reference line, thereby locating the apex of the 30° angle shown at 48. The entire instrument is then rotated through a clockwise angle of 90° to the orientation shown in FIG. 5. With straight edge 21 of the inner member aligned to intersect the previously drawn apex point, a second line 49 is drawn along the straight edge to define an included angle shown at 50 of 60°, i.e., the complement to the given 30° angle. With the base line of the right triangle thus drawn, the right hand side edge of the instrument is then used to draw the vertical hypotenuse line 51. Where it is desired to draw the complement angle in the top right hand quadrant, then the instrument is turned top for bottom so that edge 52 rests against the T-square. A line is then drawn along straight edge 21 to form the 60° complement angle with respect to reference line 46.

Graphics instrument 10 may be used for the direct reading of the complement of any measured angle. Assume that the instrument is positioned with the 0° axis of the outer scale member aligned along one base leg of the given angle. The value of the angle can be directly read in degrees by observing the location of the remaining baseline on the appropriate row of degree marks and adjacent cardinal degree values. To determine the complement, the inner scale member is rotated so that the axis of its straight edge is aligned along the second base leg. The value of the complement angle then can be read from the intersection of the 90° cardinal mark on the outer scale with the complement number on the inner row of degree values.

Figure 8:
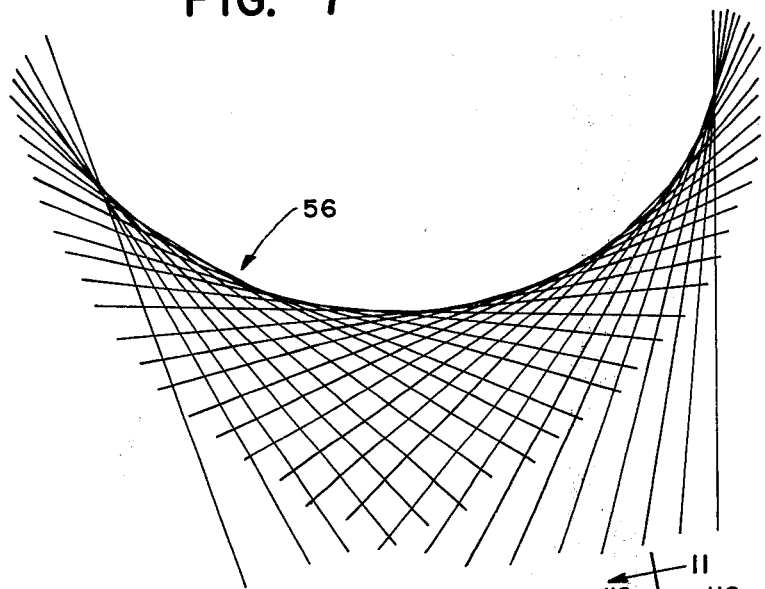
FIG. 8 is a plan view of the family of lines drawn by the procedures of FIG. 7.

FIGS. 7 and 8 illustrate the use of graphics instrument 10 for drawing a family of straight lines which form the envleope of any desired curve such as a circle, ellipse, spiral, parabola, or hyperbola. The ruled side edge 27 of the instrument is first placed along a reference edge, such as the arm 55 of a T-square lying across a drawing board. With outer scale member 12 fixed, the inner scale member is then rotated to the desired initial position shown at 11a and a line drawn along the axis of its straight edge. The instrument is then advanced in equal increments along the T-square, using ruled edge 27 for measuring the intervals. At each position inner scale member is rotated through equal angle intervals, as shown at 11a through 11e, using the graduated degree scales for measuring the angle intervals. Also at each position lines are drawn along the axis of straight edge 21 so that a family of lines is established as the envelope of a curve, such as the curve 56 illustrated in FIG. 7. Different curves may thus be established by varying the intervals of angular rotation of the inner scale for equal interval linear movement, or by varying the intervals of linear movement for equal intervals of angular rotation. In addition, a family of parallel lines may be drawn at any given angle with respect to any reference edge or line. This is accomplished by placing a side edge of the instrument on the reference edge, such as a T-square, rotating the inner scale through the given angle with respect to the outer scale, and drawing the parallel lines along the axis of the inner scale straight edge as the instrument is advanced in intervals along the T-square. Graphics instrument 10 will also find application in drawing and measuring many other geometric forms and mathematical functions.

FIGS. 3 and 4 illustrate a graphics instrument 57 incorporating another embodiment of the invention. Instrument 57 comprises an inner scale member 58 mounted for coplanar rotation within an outer scale member 59. The outer scale member is formed with an octagon configuration, and the invention contemplates that other polygon configurations could be employed with any number of sides. The side edges of the polygon form straight edges for drawing lines and to permit the instrument to be aligned along a reference edge over the drawing board, such as along a T-square.

An elongate arm 60 extends outwardly from one side edge of outer scale member 59 and this arm is provided with a straight edge 61 which extends along an axis intersecting the center of rotation of the scale members. A graduated scale such as the illustrated linear measurement scale is printed along straight edge 61. A circular graduated scale is printed around the inner periphery of outer scale member 59, and this graduated scale displays angular measurement with cardinal values of degree and radian units in a manner similar to the scales described for the embodiment of FIG. 1.

Inner scale member 58 is annular and is formed with a central opening 62. The outer periphery of this scale member is printed with a graduated scale in register with the circular scale of the outer member. The scale of member 58 displays angular measurement with cardinal values of degree units. An elongate arm 63 is mounted across the top face of inner scale member 58, and this arm is provided with a straight edge 64 which lies along an axis intersecting the center of rotation of the two members. A graduated scale such as the illustrated linear measurement scale is formed along this straight edge. The arm 63 is secured to opposite sides of the inner scale member by suitable means such as plastic welding or an adhesive, and lies in a plane above the plane of the two scale members to permit the arm to be moved through an arc as the inner scale member is rotated about the outer member. The portion of arm 63 which extends beyond the outer periphery of member 59 is increased in thickness so that its lower surface is coplanar with the lower surface of the scale members, as shown in FIG. 4. This permits the arm to rest upon or slide over the drawing board while clearing the corners of the octagon shape of the outer member.

Means is provided to lock the inner scale member in a selected position with respect to the outer member. Preferably the locking means comprises an eccentric cam 66 mounted in a bore formed in the outer member and adapted to be manually turned so as to frictionally engage and lock the outer periphery of the inner member.

The embodiment of FIG. 3 may be used as a T-square by first rotating inner scale member 58 and arm 63 to the 90° orientation shown at 63a and locking in position by turning cam 66. The entire instrument 57 is then turned over so that the surface which is shown in plan view in FIG. 3 lies against the drawing board. The portion of arm 63 which is shown in FIG. 4 as extending above the plane of the two scale members is then moved against the edge of the drawing board as a reference surface for anchoring the instrument. The instrument is then moved along the edge of the drawing board in the manner of a T-square. As desired, cam 66 may be unlocked and the outer scale and arm 63 moved and relocked at any desired angular position about the inner scale member so that the instrument serves as a variable angle T-square.

FIGS. 9–15 illustrate another embodiment of the invention providing a graphics instrument 68 that is specially adapted to be assembled in alternate configurations. In the configuration shown in FIGS. 9 and 10 the instrument is assembled for use in the manner of a variable angle protractor, and in FIGS. 12 and 13 the instrument is assembled for use as a variable angle T-square.

Graphics instrument 68 includes an inner scale member 69 and outer scale member 70 which are coplanar and mounted for concentric mutual rotation about a common center 72. The inner scale member comprises an annulus having a circular outer periphery 73 rotatably mounted within the circular inner periphery 74 of the annulus of outer member 70. The peripheries of the two scale members are in non-interlocking engagement to permit easy disassembly and reassembly in the desired configuration.

A first radial arm 76 is carried by the inner scale member and a second radial arm 77 is carried by the outer member. As best shown in FIG. 10, second arm 77 is of integral construction and includes a radially outward elongate portion 78 having a lower surface 79 coplanar with the lower surfaces of the two scale members, together with an upper surface 80 lying in a plane spaced above the upper surfaces of the scale members. The second arm further includes a bridge portion 82 below which an arcuate groove 83 is formed concentric with center 72. Inner scale member 64 is adapted to be releasably and slidably seated within the inner side of groove 83, and outer scale member 69 is fixedly secured to outer side of this groove. An inner terminal portion 84 of the second arm extends inward from the bridge portion with side edges 86, 87 which converge to a point at center 72.

Similarly, first arm 76 is of integral construction and comprises an outer elongate portion 88 of a thickness equal to and coplanar with the second arm, a bridge portion 89 below which an arcuate groove 91 is formed, and an inner terminal portion 92 having side edges which converge to a point at center 72. Outer scale member 70 is releasably and slidably seated within the outer side of groove 91, and the inner scale member is fixedly secured to the inner side of this groove.

The points of the two terminal portions 84, 92 of the arms are separate but are in close juxtaposition to permit lines to be freely drawn along the side edges for drawing the apex of an angle. Also, the inner terminal portions have a thickness commensurate with the thickness of the elongate portions of the arms. The opposite sides 93, 94 of arm 76 and sides 96, 97 of arm 97 define straight edges to facilitate drawing lines. The facing inner straight edges 94, 96 of the two arms lie along axes which intersect the center 72 of the two scale members to permit drawing the base and terminal sides of angles which are set by angular positioning of the scale members.

The inner and outer scale members and their associated arms are formed of a material, preferably transparent, of the type described above for the embodiment of FIG. 1. In addition, a circular graduated scale describing angular degree marks is formed about the outer member, and another circular graduated scale describing angular degree marks is formed about the inner periphery of the inner scale for register with the outer scale. Trigonometric functions such as sine and cosine values for cardinal angles are formed about the inner scale, and radian values for cardinal angles are formed about the outer scale in a manner similar to that described for the embodiment of FIG. 1. On the straight edges 93, 94 and 96, 97 of the two arms graduated linear measurement scales such as in inch units are formed, and these scales extend along this inner terminal portions 84, 92. Preferably the graduated scales on the scale members and arms are printed on the lower surfaces of the elements, as viewed in the assembled configuration of FIG. 8, to eliminate parallax error in reading the measurements. Where the elements are made from an opaque material the graduated scales are printed on the upper surfaces.

Locking means is provided to lock the scale members in selected relative angular positions. The locking means includes an eccentric cam lock 98 mounted on arm 76 radially outward of the outer periphery of outer scale member 70, and an eccentric cam lock 99 mounted on the inner terminal portion 84 of arm 77 adjacent the inner periphery of inner scale member 69. As best shown in FIGS. 12 and 15 cam lock 98 comprises a circular plug 101 rotatably mounted within an opening formed in arm 76 with this opening merging with groove 91. A circular cam 102 is formed on plug 101 at a position eccentric of the axis of rotation of the plug, and a slot 102 is formed on the outer face of the cam to receive a driving tool such as a key, a coin or a screwdriver. When the cam and plug are rotated by means of the driving tool the cam is forced against the outer periphery of scale member 70 which is thus frictionally locked in place. As shown in FIGS. 10 and 14 lock 99 is similar in construction and operation and comprises a plug 103 rotatably mounted in an opening formed in inner terminal portion 84, with the opening merging with groove 83. A slotted cam 104 is formed on the plug eccentric of its axis of rotation. When the cam and plug are rotated by a driving tool engaging the slot formed in the cam, the cam frictionally engages and locks the inner periphery of inner scale member 69.

Figure 9:
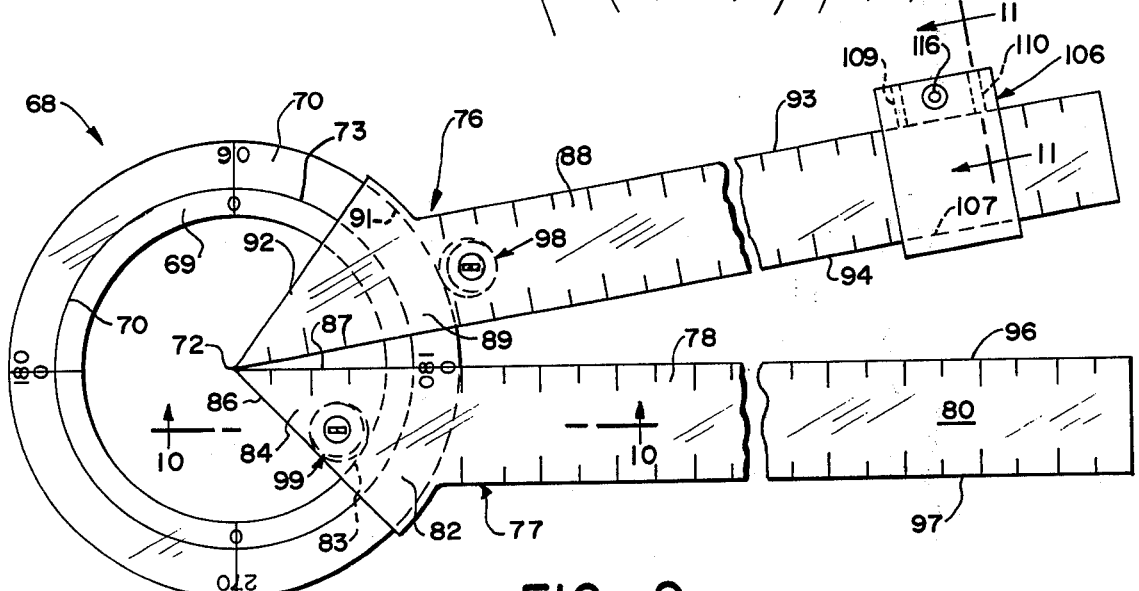
FIG. 9 is a plan view of another embodiment of the invention.

As shown in FIGS. 9 and 11 a slide indicator 106 is mounted for radial movement on arm 76. The indicator is rectangular in shape and is formed with a groove 107 adapted to slidably recieve arm such that the bottom surfaces of the indicator are coplanar with the bottom surface 108 of the arm, as shown in FIG. 11. Preferably the indicator is made of a transparent material such as a synthetic polymer whereby the graduated scales printed on the arm can be observed through the indicator. The indicator could also be formed of an opaque material such as a metal or wood frame which mounts a transparent window for observing the graduated scales.

The indicator 106 is releasably held in a selected position along the arm by means of a pair of lock devices 109, 110. The lock device 110 is typical and includes a ball 111 mounted in a bore 112 formed in the overhang portion of the indicator. The ball is yieldably urged against the side edge of arm portion 88 by compression spring 113 which in turn is seated in the bore by threaded plug 114, as shown in FIG. 11. The force of the balls acting against the arm creates sufficient frictional drag to hold the indicator in the desired position for drawing and measuring purposes, but this frictional drag may be easily overcome by moving and repositioning the indicator along the arm.

An opening 116 is formed in the overhang portion of the indicator for receiving the point of a drawing instrument. The opening comprises a cylindrical bore portion 117 projecting downwardly from the upper surface of the indicator and a conical portion 118 which opens through the lower surface.

FIGS. 12 and 13 illustrate the assembled configuration of graphics instrument 68 in which the scale members and arms are inverted for use in the manner of a T-square. In this configuration inner scale member 69 and its associated arm 76 have been disengaged from the position shown in FIG. 9, turned upsidedown, and then reassembled with arm 76 projecting downwardly and with the bottom surface of outer scale member 70 seated in groove 91 on the bridge portion of arm 76. In the resulting configuration the portion of arm 76 which projects below the coplanar surfaces of the scale members and arm 77 provides an added dimension of depth so that this arm 76 may be placed against a reference surface, such as the side edge 120 of the drawing board 121 shown in FIG. 13. For adapting the instrument as a standard T-square, arm 77 is then rotated to a 90° orientation with respect to arm 76, as observed from the relative positions of the two scale members. In such position the cam locks 98, 99 are turned to lock the scale members together, and the instrument may then be slid up and down the edge of the drawing board in the manner of a T-square. Graphics instrument 68 may also be utilized as a variable angle T-square by orienting arm 77 at a selected angle within the upper and lower right hand quadrants of the inner scale member and then locking the scale members in the selected position.

Graphics instrument may be used as a compass for drawing and measuring arcs through use of indicator 106. The indicator is moved along arm 76 to a selected position at the desired arc radius, as determined from the linear scale on the arm. A drawing instrument such as the point of a pencil is then inserted through opening 116 of the indicator and arm 76 is rotated through the desired angle while arm 76 is anchored against the drawing board. Movement of the pencil with the indicator thereby incribes the arc, the length of which may be calculated by reading the angle of rotation of the arm from the inner and outer scale members.

While the foregoing embodiments are at present considered to be preferred it is understood that numerous variations and modifications may be made therein by those skilled in the art and it is intended to cover in the appended claims all such variations and modifications as fall within the true spirit and scope of the invention.

We claim:

1. A graphics instrument comprising an annular inner scale member having a circular outer periphery and a circular inner periphery, an outer scale member having a circular inner periphery mounted for rotation with respect to the outer periphery of the inner member about a common center, said inner and outer members having co-planar surfaces which are adapted to move over a graphics surface, said outer member being formed with an outer periphery in the configuration of a polygon having adjacent sides which are in orthogonal relation to each other, means forming a first continuous graduated scale about the entire outer periphery of said inner member, means forming a second continuous graduated scale about the entire inner periphery of said outer member in register with said first scale whereby the scale members can be positioned in a selected angular relationship, an elongate member mounted on the inner member, said elongate member being formed with parallel side edges with one of the side edges extending along and forming a first straight edge along a diameter of the inner member, each side edge of the elongate member cooperating with the inner periphery of the inner member to form a pair of substantially semicircular openings of a large area relative to the areas of said co-planar surfaces whereby the semi-circular openings provide substantial open spaces for drawing and locating a wide range of angles, lines and points on the graphic surface, and means forming a third graduated scale along the first straight edge, and the outer edges of the polygon on the outer scale member forming additional straight edges, wherein said polygon configuration comprises a square, and each outer edge of said square configuration comprises a straight edge, wherein the first graduated scale includes indicia displaying a scale of angular degree measurement and indicia indicating a scale of angular radian measurement, wherein the second graduated scale includes indicia displaying a scale of trigonometric function values for the corresponding degree or radian measurements on the first scale, wherein the trigonometric function values include sine and cosine values, and wherein said first straight edge is aligned with the 0° trigonometric function values of said second graduated scale and said first graduated scale is arranged so that its 0° indicia will be in alignment with said first straight edge when said first straight edge is parallel to an outer edge of said square configuration.

* * * * *